United States Patent [19]
Sackschewsky

[11] Patent Number: 5,176,588
[45] Date of Patent: Jan. 5, 1993

[54] CONTINUOUSLY VARIABLE DRIVE TRAIN

[76] Inventor: William A. Sackschewsky, 828 W. Olive St., Fort Collins, Colo. 80521

[21] Appl. No.: 874,720

[22] Filed: Apr. 27, 1992

[51] Int. Cl.[5] .............................................. F16H 47/08
[52] U.S. Cl. ....................................... 475/33; 475/218; 475/219; 475/330
[58] Field of Search ....................... 475/33, 42, 49, 48, 475/59, 218, 219, 297, 330

[56] References Cited

U.S. PATENT DOCUMENTS

| | | | |
|---|---|---|---|
| 2,368,873 | 2/1945 | Pollard | 475/33 |
| 2,562,464 | 7/1951 | Jandasek | 475/33 X |
| 2,704,468 | 3/1955 | Horton et al. | 475/33 |
| 2,885,908 | 5/1959 | DeLorean | 475/33 |
| 3,518,898 | 7/1970 | Wagner | 475/33 X |
| 4,216,683 | 8/1980 | Sackschewsky | 475/33 |
| 5,098,350 | 3/1992 | Sackschewsky | 475/33 |

*Primary Examiner*—Leslie A. Braun
*Assistant Examiner*—Ryan W. Massey
*Attorney, Agent, or Firm*—Dean P. Edmundson

[57] ABSTRACT

A continuously variable drive train or power train which is a fluid mechanical drive system which is self-contained and self-controlled. It is useful as in a power equipment drive train between a power source and a transfer case, for example. It includes first and second rotatable bell housings, two fluid couplers, and a plurality of inter-connected planetary gear assemblies for transmitting rotational energy from a power source (e.g., an engine) to an output shaft.

5 Claims, 1 Drawing Sheet

CONTINUOUSLY VARIABLE DRIVE TRAIN

FIELD OF THE INVENTION

This invention relates to power trains or drive trains. More particularly, this invention relates to a fluid mechanical device. Even more particularly, this invention relates to a continuously variable drive train for use in power equipment drive trains, etc.

BACKGROUND OF THE INVENTION

The use of various types of transmissions for transferring energy from a power source, such as an engine, to an output shaft is well known. Some transmissions utilize a plurality of differently sized gears and require manual shifting in order to employ the differently sized gears in a specific sequence as the speed of vehicle is increased. Some other common transmissions are automatic and do not require a clutch in order to shift from one speed to another.

In my prior patent, U.S. Pat. No. 5,098,350, issued Mar. 24, 1992, I describe a continuously variable drive train which has several advantages over conventional transmissions and drive trains.

SUMMARY OF THE PRESENT INVENTION

In accordance with the present invention there is provided a unique and improved continuously variable drive train (CVDT) system which is very smooth and efficient. It provides for infinite variation in output speed. The drive train system of the invention is self-contained, self-controlled, and self-regulated. In a preferred embodiment the drive train system comprises:

(a) a first rotatable bell housing which is adapted to be connected to and rotatably driven by said power source; housing;

(b) a second rotatable bell housing within said first (c) a first fluid coupler disposed between said first and second housings, (d) a rotatable output shaft;

(e) a first planetary gear assembly comprising a first sun gear, a first ring gear (which is a double ring gear having first and second integral sections), and a first planet carrier having at least one planet gear operatively connecting said first sun gear and the first section of the first ring gear, wherein said first planet carrier is connected to said output shaft in driving engagement therewith;

(f) a second planetary gear assembly comprising a second sun gear, a second planet carrier, and at least one planet gear and a first planet reversing gear operatively connecting said second sun gear and the second section of the first ring gear;

(g) a third planetary gear assembly comprising a third sun gear which is operatively connected to the second section of the first ring gear by means of at least one planet gear;

(h) a fourth planetary gear assembly comprising a fourth sun gear, a second ring gear, and a third planet carrier having at least one planet gear operatively connecting said fourth sun gear and said second ring gear; wherein said third planet carrier is connected to said second bell housing:

(i) a fifth planetary gear assembly comprising a fifth sun gear, a fourth planet carrier, a carrier shaft secured to said fourth planet carrier, and a second reversing gear rotatably mounted on said carrier shaft; wherein said second reversing gear is in driving connection with said fifth sun gear; and wherein said fourth planet carrier is secured in a fixed position;

(j) first one-way clutch means adapted to prevent said second planet carrier from rotating in a direction opposite to the direction of rotation of said output shaft;

(k) second one-way clutch means disposed between said first bell housing and said fourth sun gear; wherein said second clutch means prevents said fourth sun gear from rotating at a speed greater than that of said first bell housing;

(l) third one-way clutch means disposed between said fifth sun gear and said output shaft; wherein when said output shaft decelerates, said output shaft becomes locked to said fifth sun gear by means of said third clutch means (i.e., so that the fifth sun gear decelerates when the output shaft decelerates); and (m) fourth one-way clutch means disposed between said second reversing gear and said carrier shaft; wherein said fourth one-way clutch means prevents positive rotation of said second reversing gear relative to said carrier shaft;

(n) a second fluid coupler disposed between said second bell housing and said third sun gear.

The first sun gear has a larger diameter than the third sun gear. Rotation of the first bell housing transmits energy through the planetary gear assemblies to the output shaft.

The apparatus of this invention does not require use of electronic computers. The apparatus operates as a continuously variable unit which is mounted between the power source and the transfer case of trucks, tractors, etc. The apparatus is smoother than use of conventional equipment. It provides for a gradual transition from one range of operation to the next range. There is no need for any shifting mechanism.

The apparatus utilizes two simple fluid couplers. There is no need for use of a torque converter. Also, there is no need for disc clutches or clutch bands. When the output shaft decelerates (e.g., when the power source decelerates), the entire CVDT decelerates as a solid mass.

Other advantages of the apparatus of this invention will be apparent from the following detailed description.

BRIEF DESCRIPTION OF THE DRAWINGS

The invention is described in more detail hereinafter with reference to the accompanying drawing, wherein like reference characters refer to the same parts and in which.

DETAILED DESCRIPTION OF THE INVENTION

Figure 1:
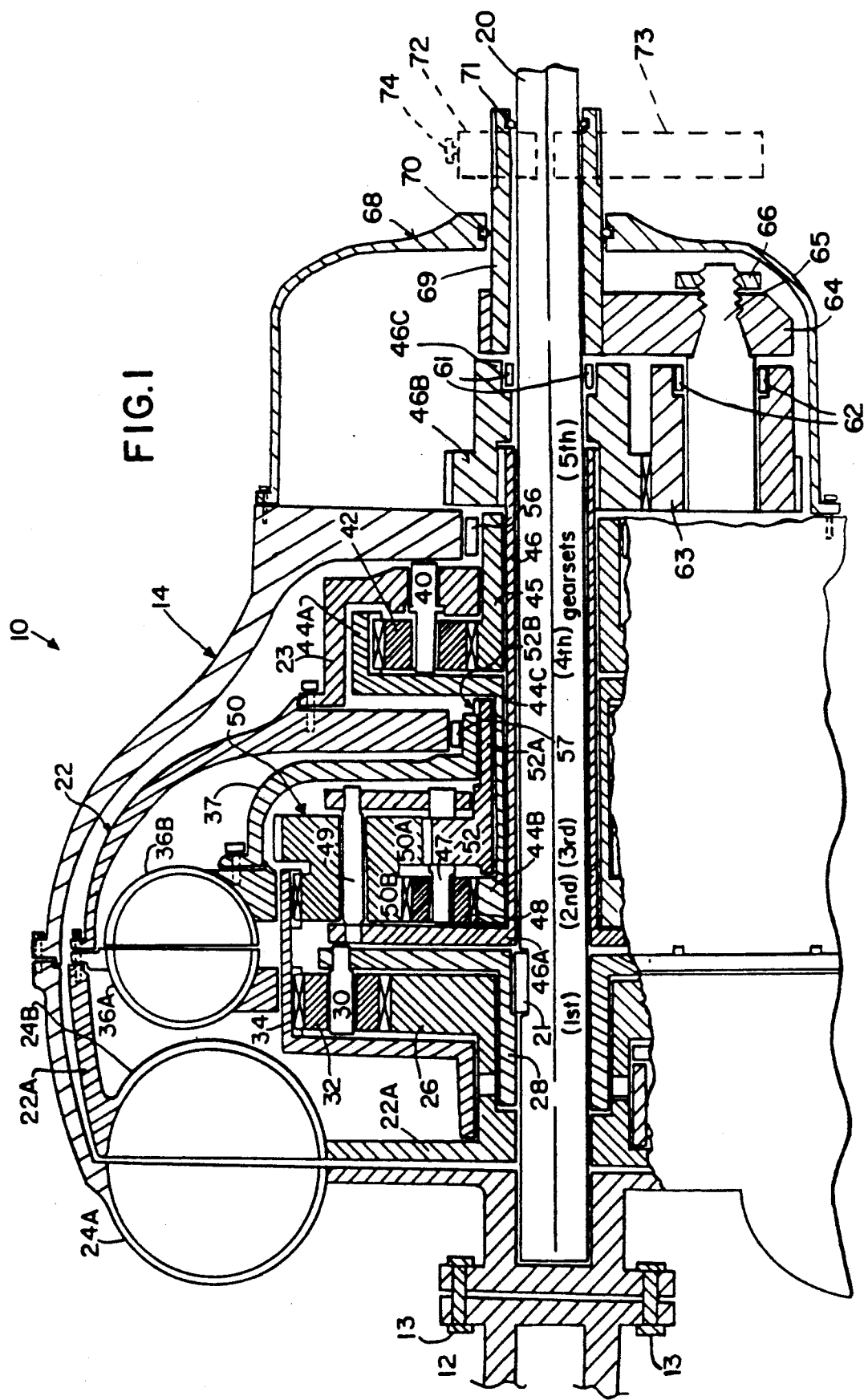
FIG. 1 is a side elevational, partially sectioned view of a preferred embodiment of the drive train system of the invention.

In FIG. 1 there is shown a preferred embodiment of continuously variable drive train system 10 for connection to a power source such as an internal combustion engine or electric motor having an output shaft 12 which serves as the power input to the drive train system. For example, the drive train system of this invention may be located rearwardly of the power source and may be connected to the output shaft 12 by means of bolts 13.

The drive train system 10 comprises a first rotatable bell housing 14 which is connected directly to the output shaft of the power source so that it rotates at the same speed and in the same direction as the shaft 12. The output shaft 20 extends through the drive train system at its central axis, as shown. The output shaft 20 can be operatively connected to any desired apparatus for utilization of the rotational energy of the shaft.

Within bell housing 14 there is a second rotatable bell housing 22 which is connected to first pump 24A through housing section 22A and first turbine 24B. Bell housing 14 and bell housing 22 are both filled with a suitable hydraulic fluid. As bell housing 14 rotates, the pump 24A tends to cause the turbine 24B and bell housing 22 to rotate in the same direction.

The front portion 22A of housing 22 includes a central hub which is splined or otherwise securely connected to the hub portion of sun gear 26. A planet carrier 28 is keyed to the output shaft 20 by means of key 21. A planet gear shaft 30 supports planet gear 32 between sun gear 26 and ring gear 34 as shown. As illustrated in the drawing, ring gear 34 is a double ring gear. It includes a first section which meshes with planet gear 32 and a second adjacent section which meshes with planet gear 50B. The first and second sections of ring gear 34 are integral with each other. They may be cast as one piece, for example, or they may be individual gears which are bolted or riveted together.

Bell housing 22 also includes two fluid coupler sections, i.e., second turbine 36A and second pump 36B. Primary sun gear 26, through planet gear 32, initially exerts negative torque and rotation on ring gear 34. It is ring gear 34 which, during starting range, initially transmits negative torque and rotation through planet gears 50A and 50B (which are integrally connected to each other) to drive sun gear 52 in positive direction at a higher rate of velocity than that of second turbine 36A, but sprague clutch 57 locks up to prevent the velocity of sun gear 52 and second pump 36B from exceeding that of turbine 36A. The negative rotation exerted on ring gear 34 occurs only initially. Eventually ring gear 34 will rotate in positive direction. Consequently, turbine 36A and pump 36B rotate positively at equal velocities. Thus, no driving torque will be generated between turbine 36A and pump 36B during the starting range.

At the rear of housing 22 there is a planet carrier housing 23 which serves to support planet gear shaft 40 on which there is carried a planet gear 42 between sun gear 45 and ring gear 44A. Sun gear 44B is connected to ring gear 44A by means of sleeve portion 44C.

Member 37 is connected at its upper end to pump 36B and at its lower end it is splined to tubular shaft 52A via spline 52B. The opposite end of sleeve 52A comprises sun gear 52.

A reversing planet gear 48 is carried on planet shaft 47 between sun gear 44B and planet gear 50. As shown, the planet gear 50 includes two gear sections (50A and 50B), one of which is larger than the other, as illustrated. One portion (50B) resides between planet gear 48 and ring gear 34. The other portion (50A) is in operable connection with sun gear 52.

Sun gear 46B is securely mounted at its forward end on the splined end of tubular shaft 46. One way clutch 61 is located between the rearward portion 46C of sun gear 46B and output shaft 20, as illustrated. Planet carrier 64 is welded or otherwise securely attached to tubular shaft 69. The tubular shaft 69 surrounds output shaft 20 and is securely splined or fastened to stationary mounting blocks 72 and 73. Bolt 74 secures the mounting blocks together. The mounting blocks are secured to the frame of the vehicle.

Carrier shaft 65 is secured to planet carrier 64. Nut 66 is threaded to the end of shaft 65 which extends through carrier 64. Reversing gear 63 is rotatably mounted on shaft 65. One-way clutch 62 is positioned between reversing gear 63 and shaft 65 to prevent positive rotation of gear 63 while allowing negative rotation of gear 63.

When the sprague clutch 62 becomes locked, the reversing gear 63, sun gear 46B, tubular shaft 46, planet carrier 46A, planet shaft 47, and planet shaft 49 all remain stationary relative to each other. Planet shafts 47 and 49 are carried by planet carrier 46A. One-way (sprague) clutch 56 is located between the hub of sun gear 45 and bell housing 14 to prevent the sun gear 45 from rotating faster than housing 14. One way (sprague) clutch 57 is located between member 37 and housing 22 to prevent member 37, sun gear 52 and coupler section 36B from rotating faster than housing 22.

The drive train system 10 provides three ranges of operation with a gradual transition from one range to the next without any external controlling device. All of the gears of the drive train system are permanently and rotatably interconnected and remain so throughout all three ranges of operation.

Because the drive train system provides for forward driving of the output shaft, a conventional gear box may be connected to the output shaft to provide for neutral, forward drive, and reverse drive operation.

The operation of the drive train system will now be explained. In the first range of operation, the first pump and first turbine, in conjunction with the first sun gear, third sun gear and double ring gear, exert torque and rotation on the output shaft. Also, the second pump is caused to rotate at a rate of velocity equal to that of the second turbine. Specifically in the first range of operation, first pump 24A and housings 14 and 68 begin to spin. Seal 70 allows housing section 68 to rotate relative to shaft 69. Then first turbine 24B and sun gear 26 rotate in a positive direction (i.e., in the same direction as shaft 12 from the power plant). Planet gear 32 will rotate negatively on planet shaft 30 to drive double ring gear 34 in negative direction. Ring gear 34 will rotate planet gear 50 negatively on planet shaft 49 to drive sun gear 52 in positive direction. However, the velocity of the sun gear 52 is restrained to rotate only to the extent of the positive velocity of turbine 24B. This is due to the locked up one-way clutch 57. Turbine 36A and pump 36B rotate at equal velocities during the starting or first range of operation. Accordingly, elements 52, 37, 24B, 22A, 36A, 36B and sun gear 26 will all rotate as one unit.

Sun gear 26 is larger than sun gear 52 and has more teeth (e.g., 78 teeth versus 54 teeth). Both gears are indirectly in mesh with double ring gear 34. Consequently, there exists a ratio differential between the ratio of the first gear set and the ratio of the third gear set. This ratio differential is such that double ring gear 34 is allowed to rotate in negative direction, but it is also simultaneously restrained to a limited degree. Since sun gear 52 becomes locked to turbine 24B and also becomes locked indirectly to sungear 26, this sun gear 52 serves as a rotating reaction member. This reaction is transmitted through planet gears 50A and 50B (which are integral portions of the same gear) to restrain the negative velocity of double ring gear 34. This conversely exerts a positive torque and rotation on planet carrier 28 and output shaft 20, merely at a velocity equal to the extent of the restraint.

If sun gear 26 has 78 teeth and sun gear 52 has 54 teeth, for example, then there is a 24 tooth differential which provides a certain degree of restraint on double ring gear 34. If sun gear 26 has 78 teeth and sun gear 52 has 68 teeth, then there is only a 10 tooth differential between the two gears which provides less restraint on the ring gear 34. If sun gear 26 and sun gear 52 have an equal number of teeth, then there is no differential. As a result, there would be no restraint on ring gear 34. Consequently, ring gear 34 would be allowed to rotate negatively without exerting any torque or rotation on output shaft 20.

Assuming that sun gear 26 has 78 teeth and sun gear 52 has 54 teeth, then one complete revolution of these sun gears is equal to 24.9366 of the 114 teeth of ring gear 34. This indicates that ring gear 34 has been restrained in the amount covering 24.9366 teeth of the ring gear's 114 teeth. This results in a ratio of 4.5716:1 (turbine to output ratio). Consequently, the positive rotation of sungear 26 will now rotate planet gear 32 negatively on planet shaft 30 and cause planet gear 32 to be rolled positively around the inner circumference of ring-gear 34, the distance of the restrained 24.9366 teeth which will result in a $$\frac{114}{24.9366} = 4.5716:1 \text{ turbine-to-output shaft speed ratio.}$$

This sequence will continue tooth by tooth throughout the first range of operation, at a turbine to output speed ratio of 4.5716:1.

During the second part of the first range of operation, the negative rotation of ring gear 34 is utilized in that it rotates planet gear 50 negatively while gear portion 50A rotates sun gear 52 positively and gear portion 50B rotates reversing planet gear 48 on shaft 47 to rotate sun gear 44B and ring gear 44A of the fourth gear set in negative direction. Ring gear 44A and gear 34 always rotate in the same direction. The orbit of planet shaft 40 and planet gear 42, plus the negative rotation of ring gear 44A, causes sun gear 45 to rotate. Ring gear 44A, through planet gear 42, accelerates sun gear 45 at the rate of velocity five times that of coupler section 24A and of the main drive shaft 12. Eventually, sun gear 45 will reach the velocity of shaft 12 and housing 14. At that point, one-way clutch 56 will lock up to prevent the velocity of sun gear 45 from exceeding that of the shaft 12 and coupler pump 24A. This then initiates the intermediate range of operation.

When the velocity of turbine 24B, housings 22 and 23, and the orbit of planet shaft 40 and planet gear 42 exceeds the lock-up point of one-way clutch 56, then planet gear 42 will employ sun gear 45 as a rotating reaction member to exert positive torque (restraint) on the negative rotating ring gear 44A.

During the starting range, the power flow originated from the negative rotation of ring gear 34 and flowed through gears 50B, 48, and 44B to ring gear 44A of the fourth gear set. However, during the intermediate range, the power flow reverses and originates from the orbiting planet shaft 40 and flows through gears 42, 44A, 44B, 48 and 50A to restrain ring gear 34. When the negative rotation of ring gear 34 is restrained, that allows sun gear 26, through planet gear 32, to exert additional torque and acceleration to planet carrier 28 and therefore output shaft 20.

Eventually, ring gear 34 will reach the point of zero velocity and then begin to rotate and accelerate in the positive direction. Although the factor of "restraint" does not cease, the power flow originating through planet shaft 40 and transmitted through 44A, 44B and 50A will assist in accelerating ring gear 34, planet carrier 28 and output shaft 20.

During the starting range and through a portion of the intermediate range, the negative reaction exerted on planet carrier 46A, tubular shaft 46 and sun gear 46B exerts a positive torque on reversing gear 63. However, one-way clutch 62 immediately locks reversing gear 63 to shaft 65, which prevents positive rotation of gear 63. This then locks up the entire assembly (from shaft 65 to reversing gear 63 to sun gear 46B to tubular shaft 46 to planet carrier 46A). Thus, the positive reaction force on mounting block 73 rebounds back through reversing gear 63 to exert the required negative reaction force on sun gear 46B, tubular shaft 46, and planet carrier 46A.

From the beginning of the intermediate range, the torque generated through shafts 40, 42, 44A, 44B, 48, 50A and 50B to sun gear 52 has forced gear 52 and pump 36B to decelerate back towards zero velocity. With turbine 36A accelerating in the positive direction and pump 36B decelerating, there occurs a "kinetic" energy buildup within the fluid coupler 36A/36B. When this "kinetic" energy builds up to a point where it overpowers the negative torque transmitted through sun gear 44B, then pump 36B and sun gear 52 (through gears 50A and 50B and reversing planet gear 48) will employ the greatly accelerated sun gear 44B as a rotating reaction member to assist ring gear 34 in accelerating planet carrier 28 and output shaft 20.

At this point, the final range of operation is initiated. The "kinetic" energy generated in fluid coupler 36A/36B and exerted on pump 36B and sun gear 52 is great enough to assist in accelerating ring gear 34, planet carrier 28 and output shaft 20. In other words, sun gear 52 drives gears 50A and 50B. Then gear 50B, through gear 48, uses gear 44B as a rotating reaction member to cause ring gear 34 to accelerate. This results in acceleration of output shaft 20.

The apparatus shown and described herein operates through a triple path drive. Sun gear 26, sun gear 44B, and sun gear 52 all drive simultaneously. As previously described, sun gear 52 (through gears 50A, 50B and reversing planet gear 48) uses the greatly accelerated sun gear 44B as a rotating reaction member to assist gear 34 in accelerating planet carrier 28 and output shaft 20. Finally, all elements will rotate, each at its ultimate rate of velocity, driven through the triple path drive.

During the final range of operation, any slippage occurring in either fluid coupler tends to cause deceleration of ring gear 34, and increased load on output shaft 20 will decelerate ring gear 34. This allows turbine 24B and sun gear 26 to advance. An increase in torque input will also decelerate ring gear 34 and allow pump 24A and turbine 24B and sun gear 26 to advance without affecting the velocity of the output shaft 20. Thus, with load on the output or increasing torque input, or both, will enhance the turbine to output speed ratio.

In reviewing the operation of the apparatus of this invention it will be seen that some sun gears serve as driving elements and in other instances these same sun gears will serve as rotating reaction members. This multiple feature has not heretofore been utilized in drive trains and is very unique.

During the starting range, sun gear 26 serves as a driving element, planet carrier 46A serves as a stationary reaction member, and sun gear 52 serves as a rotating reaction member. Shaft 46, sun gear 46B and reversing gear 63 are stationary. Sun gear 45 idles freely in the positive direction. During the starting range, one-way clutches 62 and 57 lock-up, and clutches 56 and 61 over run.

During the intermediate range, sun gear 26 and sun gear 44B serve as driving elements. Planet carrier 46A serves as a stationary reaction member, and sun gear 45 serves as a rotating reaction member. Shaft 46, sun gear 46B and reversing gear 63 are stationary. During the intermediate range, one-way clutches 62 and 56 lock up, and one-way clutches 57 and 61 over run.

During the final range, sun gear 26 still serves as a driving element, and sun gear 52 now also serves as a driving element. Sun gear 44B serves as a fast rotating reaction member. Planet carrier 46A, shaft 46 and sun gear 46B rotate in a positive direction. One-way clutch 56 locks up and sun gear 44B serves as a reaction member. One-way clutches 57 and 61 over run. One-way clutch 62 over-runs, and gear 63 rotates freely in a negative direction.

During the intermediate range and the final range of operation, when the accelerator pedal is depressed to speed up the motor, the following is what happens at the site of ring gear 34: pump 24A and bell housing 14 will surge ahead, while turbine 24B and output shaft 20 will momentarily (a fraction of a second) remain at a constant velocity. When housing 22 accelerates, clutch 56 unlocks and permits sun gear 45 to accelerate and permits ring gear 44A, sun gear 44B, and gears 48 and 50 to decelerate double ring gear 34.

As outer housing 14 surges ahead, then pump 36B and sun gear 52 will be caused to surge ahead and, through gear 50, will permit double ring gear 34 to decelerate.

As turbine 24B and sun gear 26 surge ahead (before sun gear 45 velocity reaches that of housing 22 to again lock-up clutch 56), then sun gear 26 (through planet gear 32) will decelerate double ring gear 34.

In the first phase of the starting range, the ratio differential between the first gear set and the third gear set is such that sun gear 52 permits negative rotation of ring gear 34, but simultaneously restrains the velocity of gear 34 to a certain degree, which results in a 4.5716:1 turbine to output speed ratio.

In the second phase of the starting range the negative rotation of ring gear 34, through gears 50B, 48, 44B, 44A and 42 drives sun gear 45 in positive direction at a rate of velocity five times that of housing 14 and pump 24A. Eventually sprague clutch 56 locks sun gear 45 to housing 14 to initiate the intermediate range.

In the first phase of the intermediate range (when sprague clutch 56 locks up) then the path of power flow reverses—it flows from the orbiting planet shaft 40 where gear 42 employs sun gear 45 as a rotating reaction member to drive gears 44A, 44B, 48 and 50B to restrain ring gear 34.

In the second phase of the intermediate range, the drive through gears 42, 44A, 44B, 48 and 50B continues and then switches to gear 50A to decelerate sun gear 52 and pump 36B. Ring gear 34 at this time is rotating in positive direction.

In the final range there is a triple path drive. Ring gear 44A and sun gear 44B are accelerating in positive direction, and through gears 48 and 50B, assist in accelerating ring gear 34. Pump 36B and sun gear 52 accelerate, and sun gear 52 (through gears 50A, 50B and 48) employs fast rotating sun gear 44B as a rotating reaction member to accelerate planet gear 50B and ring gear 34—all this to assist sun gear 26 in accelerating planet carrier 28 and output shaft 20.

When the vehicle decelerates, the output shaft 20 also decelerates. As shaft 20 begins to decelerate the one-way clutch 61 locks shaft 20 to sun gear 46B to drive planet carrier 46A in a negative direction. This then locks up the entire gear train. Consequently, as shaft 20 continues to decelerate, it will decelerate the entire CVDT as a solid mass, even to the point of zero velocity. At any time during deceleration, due to the "self-controlling" features of the CVDT, it will continue in the same turbine-to-output speed ratio to which it has decelerated.

The basic concept of the apparatus of this invention involves planetary gearsets where (a) the sun gear of the gearset is permitted to rotate freely in a positive direction, and (b) the ring gear of the same gearset rotates freely in a negative direction without exerting rotation on the output shaft, and (c) means are provided to gradually restrain the negative velocity of the ring gear to thereby exert torque and rotation on the output shaft. The largest sun gear serves as the primary input. The factor of restraint does not cease; it is present through operation of the apparatus regardless of the range of operation.

As previously described herein, the entire continuously variable drive train system spins or rotates during operation when it is connected to a power source. All of the elements of the system are permanently and rotatably interconnected. No shifting is required. A gradual transition is obtained from one range of operation to the next range of operation. Other innovations of the system of this invention are apparent from the foregoing description and the accompanying drawings.

Other variants are possible without departing from the scope of this invention. The absolute size of the various gears present in the system, and the number of teeth on each gear, may vary. These are matters which are considered design parameters which can be varied by engineers or designers when designing the system for a particular application.

What is claimed is:

1. A continuously variable drive train system for operable connection to a power source, said system comprising:
  (a) a first rotatable bell housing which is adapted to be connected to and rotatably driven by said power source;
  (b) a second rotatable bell housing within said first housing;
  (c) a first fluid coupler disposed between said first and second housings,
  (d) a rotatable output shaft;
  (e) a first planetary gear assembly comprising a first sun gear, a first double ring gear having first and second sections, and a first planet carrier having at least one planet gear operatively connecting said first sun gear and said first section of said first ring gear, wherein said first planet carrier is connected to said output shaft in driving engagement therewith;
  (f) a second planetary gear assembly comprising a second sun gear, a second planet carrier, and at least one planet gear and a first planet reversing gear operatively connecting said second sun gear and said first ring gear;

(g) a third planetary gear assembly comprising a third sun gear which is operatively connected to said first ring gear by means of at least one planet gear;

(h) a fourth planetary gear assembly comprising a fourth sun gear, a second ring gear, and a third planet carrier having at least one planet gear operatively connecting said fourth sun gear and said second ring gear; wherein said third planet carrier is connected to said second bell housing:

(i) a fifth planetary gear assembly comprising a fifth sun gear, a fourth planet carrier, a carrier shaft secured to said fourth planet carrier, and a second reversing gear rotatably mounted on said carrier shaft; wherein said second reversing gear is in driving connection with said fifth sun gear; and wherein said fourth planet carrier is secured in a fixed position;

(j) first one-way clutch means adapted to prevent said second planet carrier from rotating in a direction opposite to the direction of rotation of said output shaft;

(k) second one-way clutch means disposed between said first bell housing and said fourth sun gear; wherein said second clutch means prevents said fourth sun gear from rotating at a speed greater than that of said first bell housing;

(l) third one-way clutch means disposed between said fifth sun gear and said output shaft; wherein when said output shaft decelerates, said output shaft becomes locked to said fifth sun gear by means of said third clutch means;

(m) fourth one-way clutch means disposed between said second reversing gear and said carrier shaft; wherein said fourth one-way clutch means prevents positive rotation of said second reversing gear relative to said carrier shaft;

(n) a second fluid coupler disposed between said second bell housing and said third sun gear;

wherein said first sun gear has a larger diameter than said third sun gear; wherein rotation of said first bell housing transmits energy through said planetary gear assemblies to said output shaft.

2. A drive train system in accordance with claim 1, wherein said second sun gear is integral with said second ring gear.

3. A drive train system in accordance with claim 1, wherein said second bell housing is connected to said first sun gear.

4. A drive train system in accordance with claim 1, wherein each of said sun gears has a central axis which is coincident with the central axis of said output shaft.

5. A drive train system in accordance with claim 1, wherein said third sun gear is larger than said second sun gear.

* * * * *